Jan. 16, 1968   R. BIERHOFF   3,363,675
HOT-WATER GENERATOR WITH HEAT-STORAGE MEANS
Filed March 22, 1966   2 Sheets-Sheet 1

Rolf Bierhoff
INVENTOR.

BY
Karl F. Ross
Attorney

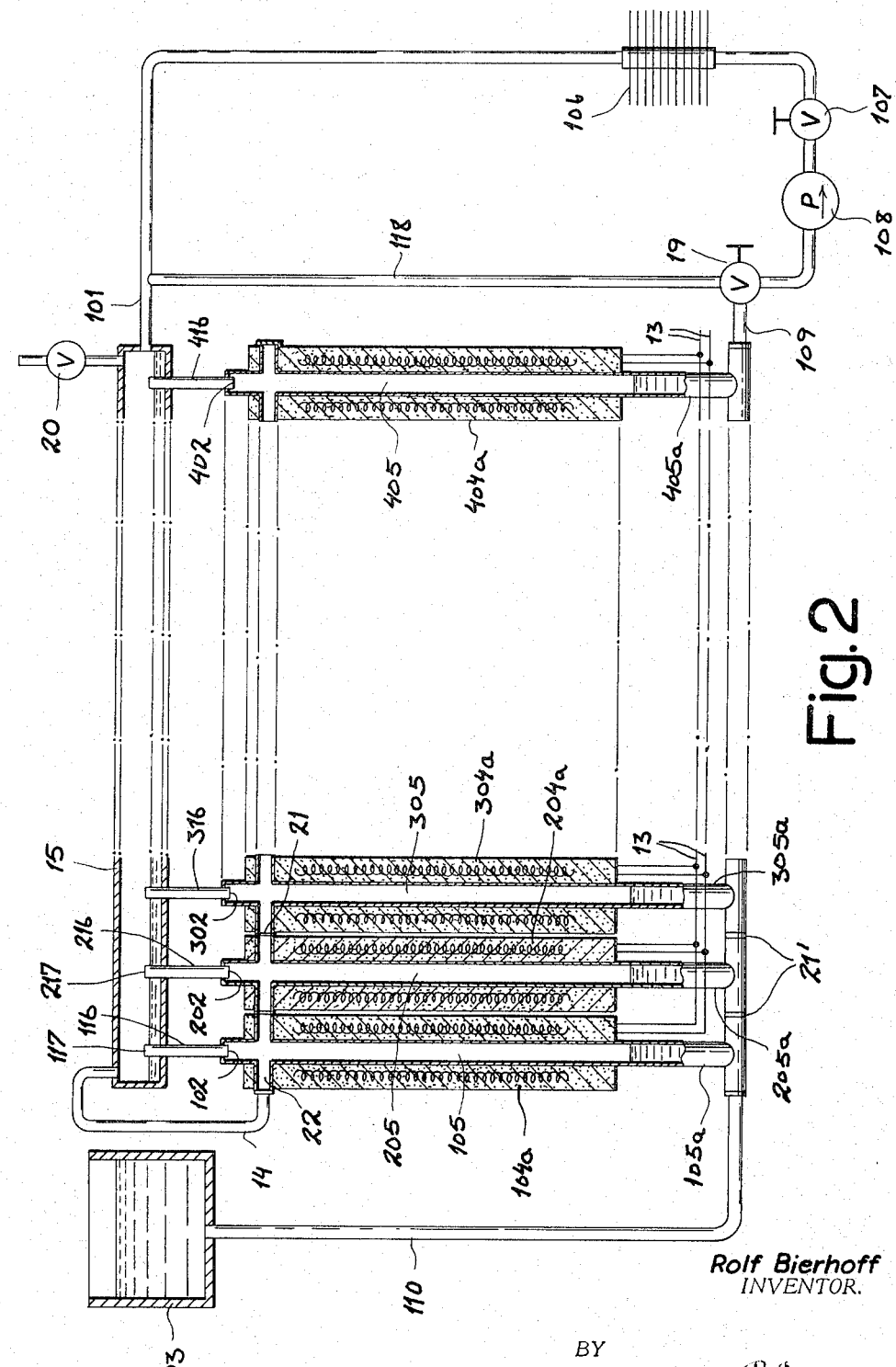

United States Patent Office 3,363,675
Patented Jan. 16, 1968

3,363,675
HOT-WATER GENERATOR WITH
HEAT-STORAGE MEANS
Rolf Bierhoff, Ettlingen, near Karlsruhe, Germany, assignor to Firma Rheinisch-Westfalisches Elektrizitatswerk A.G., Essen, Germany
Filed Mar. 22, 1966, Ser. No. 536,366
Claims priority, application Germany, Mar. 24, 1965,
R 40,190
8 Claims. (Cl. 165—32)

ABSTRACT OF THE DISCLOSURE

A hot-water generator wherein a body of water only partially fills a hermetically sealed chamber at elevated pressure and is heated by thermo-exchange with a heat-storage sheath containing intermittently energized heating elements, the water outflow from the chamber being throttled while delivery of fresh water is effected above the liquid level at the top of the chamber and a pressure-equalizing receptacle externally of the chamber communicates with the body of liquid therein below the liquid level and sustains a head of water equal to the pressure in the chamber. The inlet is a spray head directing a stream of water downwardly out of contact with the walls of the chamber or a standpipe passing outwardly through the body of liquid at an incline to the vertical for discharging a trickle of water downwardly along the pipe.

Figure 1:
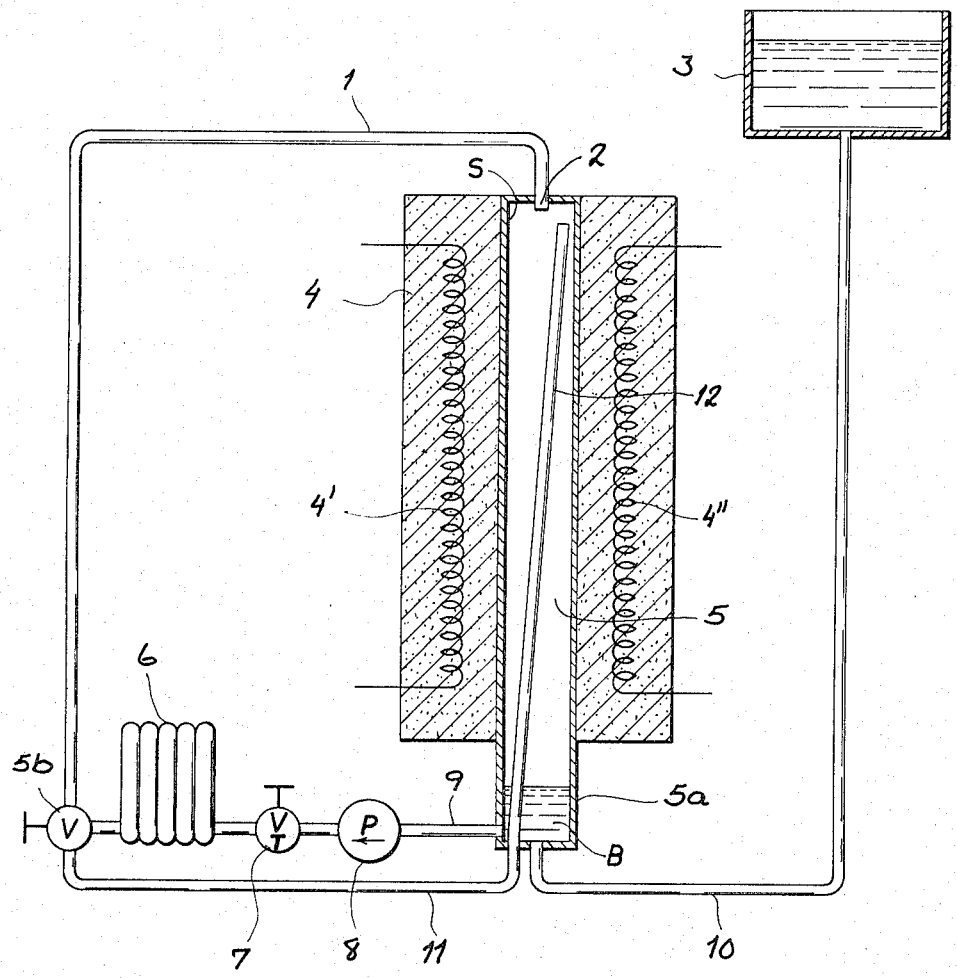

My present invention relates to a hot-water generator with heat-storage means and, more particularly, to improvements in hot-water supply apparatus especially suitable for use in central heating installations.

Hot-water generators with heat-storage means or thermal reservoirs have been proposed heretofore and generally comprise hot-water conduits or chambers surrounded by high heat-capacity bodies which can be brought to an elevated temperature and, in accordance with the demand, transfer heat to a liquid (usually water) contained in the chamber or conduit. Such devices have the advantage that they can make use of energy available only at limited times even when the heated water is required at times other than those at which the energy is available. For example, many electrical suppliers are prepared to supply electrical energy for home-heating and water-heating purposes at times at which the demand for electricity throughout the network is reduced to a substantially lower rate than would otherwise be charged the consumer for the electricity thus made available. The same holds true for other energy sources (e.g. gas) supplied from central mains and many potential consumers of energy can make use of sources (e.g. hot exhaust gases) which are available only at limited times. Thus, heat-storage means can be exploited to act as a thermal reservoir which can be brought to an elevated temperature by the available energy source and can be drawn from, usually by the heating of water, from time to time as the demand requires. Suitable heat-storage masses and bodies include refractory materials such as ceramics (e.g. magnesite), cast iron, molten and non-molten mineral masses, salt solutions, and the like, all of which can be heated to very high temperatures (well above the boiling point of the liquid medium to which the heat is to be transferred).

In central-heating installations and other arrangements where heat exchangers (e.g. locally disposed radiators) are employed to raise the temperature of a fluid (e.g. circulating air or water to be used for washing, etc.) it has hitherto been the practice, when such heat-storage devices were employed, to heat water or other heat-transfer liquid to a temperature of the order of 90° C. and to control the water temperature by various temperature-responsive devices, pressure controls or the like, some of which were highly complex and required precision setting of thresholds and other limits. The sensitivity of such devices rendered them comparatively costly and prone to defects and it has long been sought to provide a substantially automatic regulation of the heat transfer to the liquid medium referred to earlier.

It is, therefore, an important object of the present invention to provide a hot-water generating system having a thermal reservoir or heat-storage mass which is relatively compact, of simple construction, and capable of continuous or long-term operation with a minimum of supervision.

A further object of this invention is to provide a heat-storage hot-water supply system, especially suitable for use in central heating installations (e.g. for multi-story buildings) which can be controlled with comparative simplicity and is, in general, free from complex and sensitive control mechanisms.

Still another object of this invention is to provide a hot-water heating system of the character described which is capable of operating with relatively high heat-transfer efficiency at lower temperatures of the heat-storage mass as well as at elevated temperatures thereof.

A further object of my present invention is to provide a hot-water generator suitable for use in central heating installations in which the usual intermediate circulation of a heat-transfer liquid between the hot water generated at the thermal reservoir and the fluid circulated at the heat-output body (e.g. radiators) can be eliminated.

These objects and others which will become apparent hereinafter, are attained, in accordance with the present invention, with a relatively simple but highly efficient water generator essentially comprising a heat-transfer chamber in heat-exchanging relationship with a thermal reservoir or heat-storage mass and adapted to sustain an elevated vapor pressure of a body of a heat-transfer medium forming a liquid level in this chamber, the heat-exchange chamber being connected near its bottom to an equalizing receptacle open to the atmosphere and in which the heat-exchange liquid can rise and fall in dependence upon the level of liquid within the heat-exchange chamber and the pressure therein. According to this invention, the heated liquid is withdrawn from this body of liquid within the heat-exchange chamber, i.e. at a lower point thereof (below the liquid level in this chamber) and passed through a heating element (e.g. a radiator or bank of radiators of a central-heating installation) prior to its return to the heat-exchange chamber, a pump means or other device being provided to circulate the heat-exchange liquid medium in this manner. The water outlet communicating with the base of the heat-exchange chamber can thus be provided with throttle closure valve means for controlling the flow of the heat-exchange liquid from the body thereof at the base of the chamber, as well as with the pump or other circulating means.

According to an important feature of this invention, the entire heat-exchange chamber, surrounded by the heat-storage mass or thermal reservoir, is initially filled with the heat-exchanging liquid medium (hereinafter referred to simply as water) which is heated by contact with the walls of this chamber or other surface along which the thermal reservoir is disposed to an elevated temperature sufficient at least to vaporize the water and thereby establish a vapor pressure within the closed heat-exchange chamber sufficient to displace a portion of the liquid into the equalizing receptacle disposed at least at the height of the upper portion of this chamber.

The temperature of the liquid within the heat-exchange chamber will, of course, be a function of the pressure of the vapor therein and, consequently, of the height of the liquid level in the equalizing receptacle. In accordance with the heat-exchange characteristics at the surfaces at which heat is transferred from the heat-storage mass to the body of water within the chamber, steam will be generated therewithin and the level of this body of water will vary in accordance with the steam pressure within the chamber and thus the boiling point of the liquid and its actual temperature. The column of water within the chamber will vary with the increase in pressure, as just described, thereby decreasing in height as the pressure and temperature rise, to lower the effective contact surface between the body of water and the heat-storage mass surrounding the chamber.

While reference is made herein to a heat-storage mass surrounding the chamber, it will be understood that the heat-storage mass merely defines with the chamber a heat-transfer surface extending originally along the entire length of the water column and gradually transfers heat to this column of water along its length. The heat-storage mass can be located in tubes received within this chamber as well as within compartments disposed in heat-exchanging relationship with the liquid within the chamber as it rises and falls.

As the liquid level falls, however, the total surface area adapted to sustain heat transfer between the body and liquid and the heat-storage mass is reduced in proportion to the increase in the temperature of the liquid and the vapor pressure thereabove. As this effective heat-transfer area diminishes, therefore, the quantity of heat thus transferred will decrease until a steady state is attained. Consequently, the arrangement described above provides an automatic adjustment of the higher temperature level of the body of liquid and the pressure within this closed chamber.

When the water thus heated is withdrawn from the body of liquid therebelow and passed through the heating element, which may be room heaters for a central heating installation or heat exchangers adapted to bring other liquids to an elevated temperature, the liquid is cooled and returned in a closed cycle to the heat-exchanger chamber. With such withdrawal, the level of liquid within the heat-exchange chamber may again rise to increase the effective heat-exchange area and maintain the temperature within the heat-exchange chamber of the body of liquid substantially constant. It has thus been observed that the temperature of the liquid withdrawn at the base of the heat-exchange chamber is substantially independent of the quantity of water withdrawn.

According to a more specific feature of this invention, the lower portion of the heat-exchange chamber extends downwardly below the heat-storage mass and thus below the heat-exchange surface of the chamber, the water outlet being provided in this bottom portion of the chamber. Moreover, the equalizing receptacle also communicates with the heat-exchange chamber and the body of liquid in this bottom portion. In this manner excessive steam pressure can be avoided and the possibility that the steam pressure within the chamber will drive all of the liquid therefrom can be entirely obviated. When water is not removed from the heat-exchange chamber, a minimum liquid level is established in this bottom portion, i.e. out of heat-exchanging relationship with the surfaces in contact with the heat-storage mass.

In accordance with a further feature of this invention, the water receptacle communicating with the heat-exchange chamber at its bottom portion is disposed at a level at least at the height of the upper end of the heat-exchange chamber and preferably thereabove. Moreover, the inlet from the water-circulating ducts advantageously opens at a location at the upper end of the heat-exchanging chamber. Best results are obtained when the inlet means at the upper end of the chamber is designed such that the liquid water dispensed therefrom during recirculation does not contact the heat-exchange surfaces of the chamber but passes directly into the body of water at the bottom thereof. More generally, it can be stated that it is an important feature of this invention that the inlet waer not be heated to any substantial extent by contact-type heat exchange with the surfaces of the heat-exchange chamber. This result can be obtained, in practice, by several techniques, it being preferred to provide at the inlet means a nozzle or other device adapted to dispense the recycled liquid in a substantially confined stream downwardly to the body of liquid at the base of the chamber. In another possible arrangement, in accordance with this invention, the inlet means constitutes an upwardly extending tube inclined to the vertical and passing from the bottom of the heat-exchanging chamber through the body of liquid therein and the vapor portion of the chamber to the upper part thereof at which it opens and permits the recycled water to fall in a cascade along the tube to return to the body of liquid. Both these arrangements permit a relatively long duration of contact between the recycled liquid and the vapor upon the body of water and permits the downwardly trickling liquid to partially cool the vapors and condense them; thus the recycled liquid is heated continuously until it enters the body of liquid without, however, contributing to a premature vaporization which would markedly lower the level of the body of liquid beyond that determined by the normal heat-exchange contact of the walls of the chamber with the body of liquid.

As previously mentioned, the improved hot-water generator of the present invention can act as a through-flow water heater for hot water to be dispensed for washing application or the like as well as a hot-water generator for a central-heating installation. In the latter case, the hot-water generator serves as a source of heat-exchange liquid for the heating element of the central-heating installation and is provided with a circulation pump, preferably at the water outlet of the heat-exchange chamber. The temperature at the heating element can be determined by the control of the duration of operation of the pump means (e.g. by turning the pump on and off as required) and it is likewise possible to eliminate the throttle or closure valve at the heat-exchange chamber and provide instead a temperature-control valve at one or more of the heating elements. The valve means can be operated by hand or thermometric means although it is also possible merely to use the timing control of the pump as stated above.

According to another and important feature of this invention, the heat-exchange chamber can be provided with a plurality of compartments such that the heat-storage means or thermal reservoir can be constituted as a multiplicity of thermal storage masses joined together to form a single heating installation. The heat storage masses can be brought to an elevated temperature by individual heating means or energy sources or connected in parallel or in series, as desired, to a single energy source. Preferably, however, the upper ends of the heat-exchange compartments are joined together by a pressure-equalizing duct and are provided with an equalization chamber communicating with all the upper ends of these compartments and connected in the hot-water return portion of the circuit. The inlet means of the individual compartment are advantageously fed from this equalizing duct and have standpipes opening into the equalizing chamber for receiving the liquid therefrom by overflow. The bottom portions of the heat-exchange chamber at each compartment extend downwardly below the heat-storage mass thereof and can be connected together and provided with the water receptacle mentioned above.

This arrangement of an equalizing chamber at the inlet ensures that the pressure across the inlet nozzles will be substantially equal, thereby preventing a spraying of the returned liquid at the nozzles against the wall of the heat-exchange compartment.

It will be apparent that the system described above completely eliminates the need for immediate water circulation between the heat-storage arrangement and the steam fluid delivered in the heating element and that high temperatures can be achieved by the system of the present invention without such intermediate circulation. Moreover, the automatic adjustment of the heat-exchange area ensures that the heating efficiency will always be at a maximum and eliminates completely the need for complex control devices. The systems require relatively little space and can be used efficiently for small central heating installations.

The above and other advantages, features and objects of the present invention will become more readily apparent from the following description, reference being made to the accompanying drawing in which:

FIG. 1 is an axial cross-sectional view through a heat-exchange chamber in accordance with the present invention, the remainder of the system being illustrated diagrammatically; and FIG. 2 is a diagrammatic longitudinal cross-sectional view through a multi-compartment hot-water generator in accordance with the present invention.

In FIG. 1 of the drawing I show a hot-water generator which comprises a heat-exchange chamber 5 whose lower portion 5a extends downwardly out of a heat-storage mass 4 of cast iron, magnesite, fused salt or the like in which is embedded heating coils 4' and 4" of the resistance-heating type. The coils can be connected to an energy-supply network and represent any intermittently operable means; it will be understood that the heat-storage mass 4 can also be provided with ducts for heating by hot gases, can be formed with a combustion chamber for heating by fuel-burning processes, can be formed with heating means exploiting concentrated solar energy or the like. The inner wall of the pressure-type heat-exchange chamber 5 thus constitutes a heat-exchange surface over the entire portion of the length of the chamber surrounded by the thermal reservoir or heat-storage mass 4 whereby only the lower portion 5a of the exchanger extends out of and beyond the heat-exchange region. The bottom portion 5a of the chamber 5 communicates via a duct 10 with an equalizing reservoir 3 and is formed with outlet means including a duct 9 which can be connected to the circulating means when the system is to be employed for a central-heating installation. The circulating means can include a pump 8, a throttle valve 7 capable of complete closure and a return line 1 or 11 for delivering thermally depleted water to the chamber 5 via respective inlet means 2 or 12, depending upon the setting of a distributing valve 5b.

In the circulating path, I provide at least one, but generally a plurality of heating elements represented as heat exchangers at 6, such heating elements including radiators for a central heating installation, through-flow heat exchangers for heating use, water for washing and other purposes, or any other device at which heat can profitably be used. The heat-exchange liquid emerging from the heating element 6 is "thermally depleted" in the sense that its temperature is lowered by loss of heat and it thus returns as a relatively cool liquid to the inlet means 2 or 12. As previously indicated, it is an important feature of the present invention that the inlet means deliver the relatively cool liquid to the upright chamber 5 at an upper portion thereof and for this purpose I provide a trickle head or nozzle 2 which produces a cascade of water through the chamber 5 into the body of liquid B at the bottom thereof. When the valve 5b is activated to close the duct 1 and deliver the cool liquid to line 11, this returning stream of water passes through the upwardly extending pipe 12, which is inclined to the vertical and open at the top of the chamber 5 so that the water leaving pipe 12 tends to flow downwardly along this pipe into the body of liquid B within which the pipe stands.

When the heat-storage mass 4 is cold, the body of liquid B forms a column completely filling the chamber 5 since the liquid reservoir 3 is disposed above the top of the chamber 5. It will be assumed for the purposes of this part of the discussion that the valve 7 is closed or the pump 8 is rendered ineffective. When the heat-storage mass is brought to an elevated temperature by means of the energy source connected at 4', 4", heat is rapidly transferred to the column of a liquid over substantially the entire heat-exchange surface S constituted by the wall of chamber 5 along which the mass 4 is disposed. As the water is heated to the boiling point, vapor within the chamber 5 drives the liquid level downwardly and thus forces water through the pipe 10 and into the liquid reservoir 3 until the heat of water therein balances the pressure generated within the chamber 5. When the body of water B is thus forced out of contact with the heat exchange surface S, heat is accumulated in the mass 4 and heat exchange to the liquid is of a reduced rate so that a steady state is attained with the system in the condition indicated in FIG. 1.

Now if water is withdrawn from the body of liquid in this bottom portion 5a of the chamber and used to heat the element 6, a cooled liquid is returned at 2 or 12 and passes downwardly through the chamber 5 without contact with its walls so that heat exchange between the cooled liquid and the vapor occurs. A portion of the vapor is thereby condensed as the temperature of the inlet liquid is raised and any drop in pressure is compensated by a rise in the level of the body of liquid B until contact with the heat-exchange surface S is re-established. The liquid is then vaporized to restore the steady-state conditions. The level of liquid illustrated in FIG. 1 is the minimum under operating conditions. It will be understood that the system is self-regulating with respect to the level in chamber portion 5a and that the temperature of the outgoing liquid will remain substantially constant and, for the most part, independent of demand. When the temperature of the heat-storage mass falls below the boiling point of the liquid, the liquid completely fills the chamber to improve the heat-exchange efficiency and thereby permits maximum utility of the device.

In the arrangement of FIG. 2, the upright pressure pipe chamber is subdivided into a plurality of compartments 105, 205, 305, 405 etc. each being provided with a respective heat-storage mass 104a, 204a, 304a, 404a in the manner of a multisection boiler, the masses being assembled in horizontally stacked relationship with seals at 21 and 21' so that the compartments are connected together at their upper and lower portions and are in parallel. Electrical conductors 13 deliver electrical energy in parallel to the heat-storage masses 104a, 204a etc. while a liquid reservoir 103 is connected with the intercommunicating bottom portions 105a, 205a, 305a, 405a of the sections via a line 110, this liquid reservoir being disposed at a level above the tops of the compartments 105, 205, etc.

The upper portions of the compartments 105, 205 are interconnected via a duct 22 and have respective inlets 102, 202, 302, 402, etc. adapted to dispense trickles of liquid downwardly into the body of liquid within the respective chambers without contact with the respective walls.

It has been found that this can be obtained most advantageously if the pressure differential across the inlet means 102, 202 etc. is held to be zero and to this end I provide a pressure-equalizing chamber 15 whose upper portion is connected with the duct 22 by a line 14 so that the pressure above the liquid within the vessel 15 is identical with that in the compartments. The inlets 102, 202, etc. are connected with the pressure-equalizing chamber 15 by respective standpipe 116, 216, 316, 416, etc. whose upper extremities 117, 217, etc. form overflows for the liquid supplied to the chamber 15 whereby the liquid cascades downwardly without a driving pressure and without encountering any resistance from pressure within the compartments. A venting valve 20 also communicates with the vessel 15 which is supplied with the cooled liquid via the line 101. The circulating means here includes a pump 108 and a valve 107 between the outlet 109 of the heat-exchange compartments and the heating elements 106. A mixing valve 19 is provided between the outlet 109 and a bypass pipe 118 to permit regulation of the temperature delivered to the heating element 106 by combining the hot water from the chambers 105, 205, etc. with cooled liquid from line 101. Essentially the system of FIG. 2 operates in the manner previously described in connection with FIG. 1.

The invention described and illustrated is believed to admit of many modifications, within the ability of persons skilled in the art, all such modifications being considered within the spirit and scope of the appended claims.

I claim:

1. A liquid heating apparatus, comprising:

an elongated upright pressure-sustaining heat-exchange chamber;

heat-storage means including a thermal reservoir at least partly surrounding said chamber over at least a limited portion of its length and forming along said chamber a heat-exchange surface for transfer of heat from said heat-storage means to a body of liquid within said chamber;

outlet means at an end of said chamber for controllably dispensing heated liquid from the body of liquid within said chamber;

means including a liquid-storage receptacle communicating with said body of liquid within said chamber for receiving liquid therefrom upon the development of a pressure within said chamber tending to drive said body of liquid toward said end of said chamber and for replenishing liquid within said chamber upon a reduction of pressure therein;

heating means for heating said heat-storage means at least intermittently to an elevated temperature sufficient to vaporize said liquid and generate a vapor pressure within said chamber tending to urge said body of liquid toward said end and reduce the area of contact between said body of liquid and said surface upon increase of said vapor pressure, said chamber having a bottom portion extending downwardly beyond said thermal reservoir, said outlet means communicating with said chamber at said bottom portion, said liquid-storage reservoir communicating with said chamber at said bottom portion and being disposed at a height above at least a major part of said chamber and said thermal reservoir, said outlet means including circulating means for drawing liquid from said body of liquid in said chamber, transferring heat from the liquid withdrawn from said chamber, and returning the liquid to said chamber; and inlet means communicating between said circulating means and an upper portion of said chamber for delivering the liquid from said circulating means to said chamber without substantial contact with said surface, said inlet means including a tube extending upwardly into said chamber through said body of liquid therein and inclined to the vertical while opening at an upper end of said chamber to dispense a trickle of liquid along said tube into said body of liquid.

2. An apparatus as defined in claim 1 wherein said circulating means includes at least one heating element of a central-heating installation and circulating-pump means for feeding liquid drawn from said chamber to said heating element, said heating element communicating with said inlet means.

3. A liquid heating apparatus comprising:

an elongated upright pressure-sustaining heat-exchange chamber;

heat-storage means including a thermal reservoir at least partly surrounding said chamber over at least a limited portion of its length and forming along said chamber a heat-exchange surface for transfer of heat from said heat-storage means to a body of liquid within said chamber;

outlet means at an end of said chamber for controllably dispensing heated liquid from the body of liquid within said chamber;

means including a liquid-storage receptacle communicating with said body of liquid within said chamber for receiving liquid therefrom upon the development of a pressure within said chamber tending to drive said body of liquid toward said end of said chamber and for replenishing liquid within said chamber upon a reduction of pressure therein;

heating means for heating said heat-storage means at least intermittently to an elevated temperature sufficient to vaporize said liquid and generate a vapor pressure within said chamber tending to urge said body of liquid toward said end and reduce the area of contact between said body of liquid and said surface upon increase of said vapor pressure, said chamber having a bottom portion extending downwardly beyond said thermal reservoir, said outlet means communicating with said chamber at said bottom portion, said liquid-storage reservoir communicating with said chamber at said bottom portion and being disposed at a height above at least a major part of said chamber and said thermal reservoir, said outlet means including circulating means for drawing liquid from said body of liquid in said chamber, transferring heat from the liquid withdrawn from said chamber, and returning the liquid to said chamber; and inlet means communicating between said circulating means and an upper portion of said chamber for delivering the liquid from said circulating means to said chamber without substantial contact with said surface, said compartment is subdivided into a plurality of upright heat-exchange compartments communicating with one another and with said liquid reservoir at their lower end and communicating with one another at their upper ends, said inlet means including a pressure-equilizing chamber disposed above said compartment, standpipe means individual to said compartments and extending into said pressure-equalizing chamber for receiving overflows of liquid therefrom and delivering said overflows of liquid to the respective compartments, and duct means for connecting the pressure-equalizing chamber with the connected upper ends of said compartments whereby there is substantially no pressure differential across said standpipe means.

4. An apparatus as defined in claim 3 wherein said inlet means includes nozzle means at an upper end of said chamber for dispensing a stream of liquid downwardly onto said body of liquid within said chamber without contact with said surface.

5. A liquid heating apparatus, comprising:

an elongated upright pressure-sustaining heat-exchange chamber;

heat-storage means including a thermal reservoir at least partly surrounding said chamber over at least a limited portion of its length and forming along said chamber a heat-exchange surface for transfer of heat from said heat-storage means to a body of liquid within said chamber;

outlet means at an end of said chamber for controllably dispensing heated liquid from the body of liquid within said chamber;

means including a liquid-storage receptacle communicating with said body of liquid within said chamber for receiving liquid therefrom upon the development of a pressure within said chamber tending to drive said body of liquid toward said end of said chamber and for replenishing liquid within said chamber upon a reduction of pressure therein;

heating means for heating said heat-storage means at least intermittently to an elevated temperature sufficient to vaporize said liquid and generate a vapor pressure within said chamber tending to urge said body of liquid toward said end and reduce the area of contact between said body of liquid and said surface upon increase of said vapor pressure; and inlet means for delivering a relatively cool liquid to said chamber, said inlet means including an upwardly extending tube passing through said body of liquid and inclined to the vertical while opening at an upper end of said chamber for dispensing a trickle of liquid downwardly along said tube directly into said body of liquid without contact with said surface.

6. An apparatus as defined in claim 5 wherein said outlet means includes valve means for restricting the flow of liquid from said chamber.

7. A liquid heating apparatus, comprising:
an elongated upright pressure-sustaining heat-exchange chamber;
heat-storage means including a thermal reservoir at least partly surrounding said chamber over at least a limited portion of its length and forming along said chamber a heat-exchange surface for transfer of heat from said heat-storage means to a body of liquid within said chamber;
outlet means at an end of said chamber for controllably dispensing heated liquid from the body of liquid within said chamber;
means including a liquid-storage receptacle communicating with said body of liquid within said chamber for receiving liquid therefrom upon the development of a pressure within said chamber tending to drive said body of liquid toward said end of said chamber and for replenishing liquid within said chamber upon a reduction of pressure therein;
heating means for heating said heat-storage means at least intermittently to an elevated temperature sufficient to vaporize said liquid and generate a vapor pressure within said chamber tending to urge said body of liquid toward said end and reduce the area of contact between said body of liquid and said surface upon increase of said vapor pressure, and
inlet means for delivering a relatively cool liquid to said chamber, said inlet means including nozzle means at an upper end of said chamber for dispensing a trickle of liquid downwardly into said body without contact with said surface, a pressure-equalizing chamber above said heat-exchange chamber and communicating with said nozzle via a liquid overflow, duct means for feeding a relatively cool liquid to said pressure-equalizing chamber for passage of the relatively cool liquid into said nozzle, and means communicating between the interior of said pressure-equalizing chamber and the upper end of said heat-exchange chamber for eliminating any pressure differential across said nozzle.

8. In a hot-water generator comprising an upright elongated chamber, an intermittently heated heat-storage mass in heat-exchanging relationship with a body of water in the chamber, a water-containing receptacle open to the atmosphere externally of the chamber and communicating therewith for maintaining a head of water externally of the chamber equal to the pressure therewithin, and an outlet communicating with the chamber beneath the water level therein and provided with means for throttle outflow of water from the chamber, the improvement wherein:
(a) the chamber is sealed to sustain superatmospheric pressure;
(b) the body of water only partly fills the chamber;
(c) said receptacle communicates with said chamber at a point below the level of the body of water therein; and
(d) inlet means is provided for delivering water to the chamber at a location at the upper end thereof above the level of the body of water therein.

References Cited
UNITED STATES PATENTS

| | | | |
|---|---|---|---|
| 2,058,769 | 10/1936 | Brown | 237—63 X |
| 2,341,690 | 2/1944 | Case | 237—63 X |
| 2,395,697 | 2/1946 | Tidd | 237—63 |
| 2,901,176 | 8/1959 | Hoyt | 237—66 |
| 3,105,133 | 9/1963 | Norton | 165—104 X |
| 3,269,458 | 8/1966 | Rogers | 165—32 X |

EDWARD J. MICHAEL, *Primary Examiner.*

ROBERT A. O'LEARY, *Examiner.*

M. A. ANTONAKAS, *Assistant Examiner.*